United States Patent
Qu et al.

(10) Patent No.: US 11,182,008 B2
(45) Date of Patent: Nov. 23, 2021

(54) LIQUID CRYSTAL DISPLAY PANEL, MANUFACTURING METHOD THEREOF AND DISPLAY DEVICE

(71) Applicants: BEIJING BOE DISPLAY TECHNOLOGY CO., LTD., Beijing (CN); BOE TECHNOLOGY GROUP CO., LTD., Beijing (CN)

(72) Inventors: Lianjie Qu, Beijing (CN); Hebin Zhao, Beijing (CN); Yonglian Qi, Beijing (CN); Bingqiang Gui, Beijing (CN); Minqi Chen, Beijing (CN); Tao Liu, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 341 days.

(21) Appl. No.: 16/082,950

(22) PCT Filed: Jan. 4, 2018

(86) PCT No.: PCT/CN2018/070742
§ 371 (c)(1),
(2) Date: Sep. 7, 2018

(87) PCT Pub. No.: WO2018/176975
PCT Pub. Date: Oct. 4, 2018

(65) Prior Publication Data
US 2020/0301189 A1    Sep. 24, 2020

(30) Foreign Application Priority Data
Mar. 31, 2017 (CN) .......................... 201710208960.0

(51) Int. Cl.
*G02F 1/1339* (2006.01)
*G02F 1/1343* (2006.01)
(Continued)

(52) U.S. Cl.
CPC ........ *G06F 3/0414* (2013.01); *G02F 1/13338* (2013.01); *G02F 1/13394* (2013.01);
(Continued)

(58) Field of Classification Search
CPC . G02F 2203/04103; G02F 2203/04105; G02F 1/13394; G02F 1/13338;
(Continued)

(56) References Cited

U.S. PATENT DOCUMENTS

2008/0151133 A1* 6/2008 Kim .................... G02F 1/13338
349/12
2010/0156827 A1* 6/2010 Joo ........................ G06F 3/0418
345/173
(Continued)

FOREIGN PATENT DOCUMENTS

CN    101995700 A    3/2011
CN    102236447 A    11/2011
(Continued)

OTHER PUBLICATIONS

Search Report and Written Opinion for International Application No. PCT/CN2018/070742 dated Mar. 30, 2018.
(Continued)

*Primary Examiner* — Thoi V Duong
(74) *Attorney, Agent, or Firm* — Calfee, Halter & Griswold LLP

(57) ABSTRACT

This disclosure provides a liquid crystal display panel. The liquid crystal display panel comprises: a first substrate and a second substrate arranged oppositely, a plurality of main spacers located between the first substrate and the second
(Continued)

substrate for supporting cell gap of the liquid crystal display panel, a plurality of auxiliary spacers located between the first substrate and the second substrate, and a plurality of pressure sensing electrodes in one-to-one correspondence with the plurality of auxiliary spacers; wherein a height of the auxiliary spacer is smaller than a height of the main spacer; a material of the auxiliary spacer is a piezoelectric material. This disclosure also discloses a manufacturing method of the liquid crystal display panel and a display device comprising the liquid crystal display panel.

7 Claims, 6 Drawing Sheets

(51) Int. Cl.
  *G02F 1/1333* (2006.01)
  *G06F 3/041* (2006.01)
(52) U.S. Cl.
  CPC ...... *G06F 3/0412* (2013.01); *G02F 2201/121* (2013.01); *G02F 2201/123* (2013.01); *G06F 2203/04105* (2013.01)
(58) Field of Classification Search
  CPC .... G02F 1/1335; G02F 1/1339; G02F 1/1343; G02F 2001/13396; G02F 2001/13398; G02F 2001/134318; G02F 2201/121; G02F 2201/123; G06F 3/0443; G06F 3/0445; G06F 3/045; G06F 3/044; G06F 3/04164; G06F 3/0414; G06F 3/0412; G06F 3/0488; G06F 3/04144
  See application file for complete search history.

(56) References Cited

U.S. PATENT DOCUMENTS

| | | | |
|---|---|---|---|
| 2014/0063365 A1* | 3/2014 | Li | G06F 3/0412 349/12 |
| 2015/0212633 A1 | 7/2015 | Yamagishi et al. | |
| 2018/0224991 A1 | 8/2018 | Gu et al. | |
| 2019/0114001 A1* | 4/2019 | Mugiraneza | G01L 5/00 |

FOREIGN PATENT DOCUMENTS

| | | |
|---|---|---|
| CN | 106201075 A | 12/2016 |
| CN | 106951126 A | 7/2017 |
| WO | 2014017248 A1 | 1/2014 |

OTHER PUBLICATIONS

First Office Action for Chinese Patent Application No. 201710208960.0 dated Feb. 22, 2019.

* cited by examiner

LIQUID CRYSTAL DISPLAY PANEL, MANUFACTURING METHOD THEREOF AND DISPLAY DEVICE

RELATED APPLICATION

The present application is the U.S. national phase entry of PCT/CN2018/070742, with an international filing date of Jan. 4, 2018, which claims the right of priority of the Chinese patent application No. 201710208960.0 filed on Mar. 31, 2017, the entire contents of which are incorporated herein by reference.

FIELD

This disclosure relates to a liquid crystal display panel, a manufacturing method thereof and a display device.

BACKGROUND

With the continuous development of the touch technology, the application of pressure sensitive touch technology improves the user experience greatly. The current pressure sensitive touch technology mainly includes resistance type, capacitance type, and optical type. The capacitance type changes the capacitance by changing the distance between the electrodes at the both ends of the capacitance through pressure, so as to sense the pressure by detecting the change of the capacitance.

SUMMARY

At least one embodiment of this disclosure provides a liquid crystal display panel, comprising: a first substrate and a second substrate arranged oppositely, a plurality of main spacers located between the first substrate and the second substrate for supporting a cell gap of the liquid crystal display panel, a plurality of auxiliary spacers located between the first substrate and the second substrate, and a plurality of pressure sensing electrodes in one-to-one correspondence with the plurality of auxiliary spacers. A height of the auxiliary spacer is smaller than a height of the main spacer, and a material of the auxiliary spacer is a piezoelectric material.

When the liquid crystal display panel is subjected to pressure, the pressure sensing electrodes at the corresponding positions are in contact with the corresponding auxiliary spacers.

Optionally, in the above liquid crystal display panel provided by at least one embodiment of this disclosure, the plurality of pressure sensing electrodes are arranged on a side of the second substrate facing the first substrate.

Optionally, in the above liquid crystal display panel provided by at least one embodiment of this disclosure, each auxiliary space is arranged on a side of the pressure sensing electrode facing the first substrate.

Optionally, in the above liquid crystal display panel provided by at least one embodiment of this disclosure, it further comprises a common electrode. The common electrode is arranged on a side of the second substrate facing the first substrate. The common electrode and the plurality of pressure sensing electrodes are formed only using one mask plate, and the common electrode is electrically coupled to the plurality of pressure sensing electrodes through a switchable switch.

Optionally, in the above liquid crystal display panel provided by at least one embodiment of this disclosure, it further comprises a common electrode. The common electrode is arranged on a side of the first substrate facing the second substrate.

Optionally, in the above liquid crystal display panel provided by at least one embodiment of this disclosure, the plurality of auxiliary spacers are arranged on a side of the first substrate facing the second substrate.

Optionally, in the above liquid crystal display panel provided by at least one embodiment of this disclosure, it further comprises a common electrode. The common electrode is arranged on a side of the first substrate facing the second substrate. The plurality of auxiliary spacers are arranged on a side of the common electrode facing the second substrate.

Optionally, in the above liquid crystal display panel provided by at least one embodiment of this disclosure, the first substrate is an array substrate; the second substrate is an opposite substrate.

Optionally, in the above liquid crystal display panel provided by at least one embodiment of this disclosure, the first substrate is an opposite substrate; the second substrate is an array substrate.

Optionally, in the above liquid crystal display panel provided by at least one embodiment of this disclosure, the piezoelectric material is an organic piezoelectric material.

Optionally, in the above liquid crystal display panel provided by at least one embodiment of this disclosure, a material of the main spacer is same as that of the auxiliary spacer.

Optionally, in the above liquid crystal display panel provided by at least one embodiment of this disclosure, the common electrode and the main spacer are in insulation arrangement.

Optionally, in the above liquid crystal display panel provided by at least one embodiment of this disclosure, an orthographic projection of the common electrode on the array substrate does not overlap with an orthographic projection of the main spacer on the array substrate.

Optionally, in the above liquid crystal display panel provided by at least one embodiment of this disclosure, it further comprises a via hole, the via hole being arranged in an area of the common electrode corresponding to the main spacer.

Correspondingly, at least one embodiment of this disclosure further provides a display device, comprising any liquid crystal display panel provided by at least one embodiment of this disclosure.

Correspondingly, at least one embodiment of this disclosure further provides a manufacturing method of a liquid crystal display panel, comprising: forming patterns of a plurality of mutually independent pressure sensing electrodes on a first substrate; forming patterns of auxiliary spacers on the pressure sensing electrodes, and forming patterns of main spacers between the pressure sensing electrodes; applying a second substrate to form a cell gap between the first substrate and the second substrate; wherein a height of the auxiliary spacer is smaller than a height of the main spacer, a material of the auxiliary spacer is a piezoelectric material.

Optionally, in the above manufacturing method of a liquid crystal display panel provided by at least one embodiment of this disclosure, it further comprises: forming a pattern of a common electrode on the second substrate; wherein a via hole is arranged in an area of the common electrode corresponding to the main spacer, so as to enable the main spacer to be aligned with the via hole after the opposite substrate and the array substrate form a cell gap.

Optionally, in the above manufacturing method of a liquid crystal display panel provided by at least one embodiment of this disclosure, the patterns of the main spacer and the auxiliary spacer are formed only using one mask plate.

Optionally, in the above manufacturing method of a liquid crystal display panel provided by at least one embodiment of this disclosure, the step that the patterns of the main spacer and the auxiliary spacer are formed only using one mask plate comprises: coating a film layer of an organic piezoelectric material on the first substrate on which a plurality of pressure sensing electrodes are formed using the coating method; and forming patterns of the auxiliary spacer and the main spacer by patterning the film layer of the organic piezoelectric material.

BRIEF DESCRIPTION OF THE DRAWINGS

In order to explain the embodiments of this disclosure and the technical solutions of the related art more clearly, next, the drawings to be used in the description of the embodiments or the prior art will be introduced briefly. The drawings described below are only some embodiments of this disclosure; other drawings may also be obtained from these drawings without any inventive efforts for those skilled in the art.

EMBODIMENTS

Figure 1:
FIG. 1 is a structural schematic view of an existing panel with the pressure sensitive touch function.

In order to make the objects, the technical solutions and the advantages of this disclosure clearer, next, the specific implementations of the liquid crystal display panel, the manufacturing method thereof and the display device provided by the embodiments of this disclosure will be explained in detail in conjunction with the drawings.

The thickness and the shape of each film in the drawings do not reflect the real proportion of the liquid crystal display panel, which only aims to explaining the content of this disclosure schematically.

Figure 2:
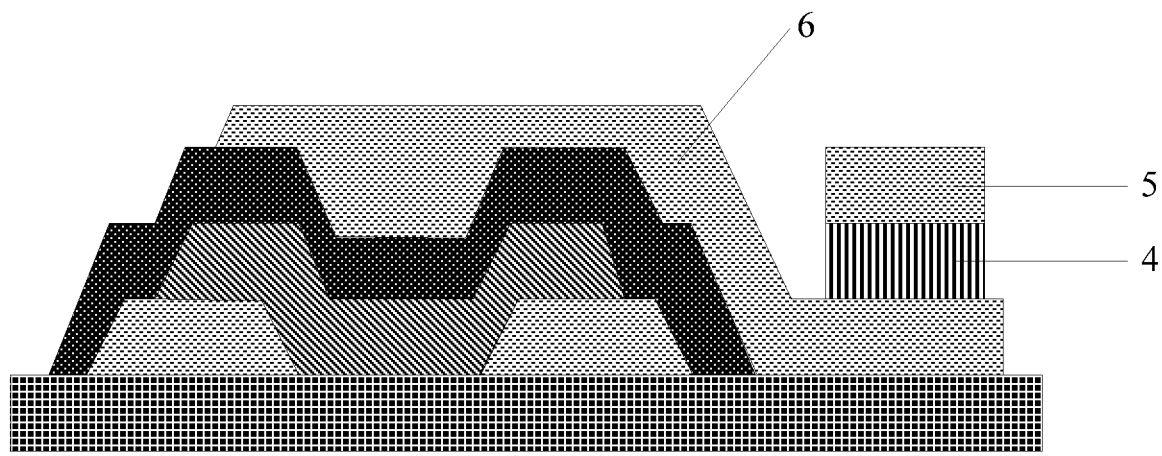
FIG. 2 is a structural schematic view of another existing panel with the pressure sensitive touch function.

At present, there are many methods for using capacitive pressure sensitive touch. For example, as shown in FIG. 1, generally, a layer of pressure material 1 is arranged at the position of the frame to realize the detection of the position, and the pressure material 1 is located between a display panel 2 and a backlight source 3. In this way, the thickness of the display panel 2 will be affected. The pressure touch screen shown in FIG. 2 employs an organic piezoelectric material 4. The magnitude and the position of the pressure are determined by connecting a piezoelectric electrode 5 to a gate 6, and by studying the voltage of the gate 6 which is changed by the organic piezoelectric material 4 under different pressures. However, relative to the conventional touch screen, since this structure needs to add a piezoelectric electrode 5, the complexity of the process is increased, and due to real time driving of the driving and sensing voltage, the power consumption of the touch screen is relatively high.

Therefore, how to implement a liquid crystal display panel of low power consumption and thin film thickness with the pressure sensitive touch function is an urgent problem to be solved by those skilled in the art.

The liquid crystal display panel provided by the embodiments of this disclosure, as shown in FIGS. 3A-3G, FIGS. 4A-4F and FIG. 5, comprises: a first substrate 01 and a second substrate 02 arranged oppositely, a plurality of main spacers 03 located between the first substrate 01 and the second substrate 02 for supporting a cell gap of the liquid crystal display panel, a plurality of auxiliary spacers 04 located between the first substrate 01 and the second substrate 02 (in the drawings, take one main spacer 03 and one auxiliary spacer 04 as an example), and a plurality of pressure sensing electrodes 05 in one-to-one correspondence with the plurality of auxiliary spacers 04. A height of the auxiliary spacer 04 is smaller than a height of the main spacer 03, and a material of the auxiliary spacer 04 is a piezoelectric material. When the liquid crystal display panel is subjected to pressure, the pressure sensing electrode 05 at the corresponding position is in contact with the corresponding auxiliary spacer 04.

In the liquid crystal display panel provided by at least one embodiment of this disclosure, by making the auxiliary spacers within the liquid crystal display panel made of piezoelectric material, when the liquid crystal display panel is subjected to pressure, the auxiliary spacers will be compressed to generate a piezoelectric signal, the pressure sensing electrodes at the corresponding positions are in contact with the auxiliary spacers, the pressure sensing electrodes may obtain the piezoelectric signal, so as to realize the pressure sensitive touch function of the liquid crystal display panel. Since the auxiliary spacers within the liquid crystal display panel are made of the piezoelectric material, the auxiliary spacers may be multiplexed as a touch layer of pressure sensing, and the touch layer does not need to be manufactured separately, thereby the thickness of the liquid crystal display panel and the manufacturing process thereof may be reduced. Moreover, the auxiliary spacers in this disclosure generate charges only when subjected to pressure, and are in a floating state when not subjected to pressure; thereby the power consumption of the liquid crystal display panel may be reduced.

Optionally, in the above liquid crystal display panel provided by at least one embodiment of this disclosure, as shown in FIGS. 3A-3G, the plurality of pressure sensing electrodes 05 are arranged on a side of the second substrate 02 facing the first substrate 01. In fact, in the above liquid crystal display panel provided by at least one embodiment of this disclosure, the first substrate 01 and the second substrate 02 are interchangeable. Hence, as shown in FIGS. 4A-4F, the plurality of pressure sensing electrodes 05 may also be arranged on a side of the second substrate 02 facing the first substrate 01.

Figure 3A:
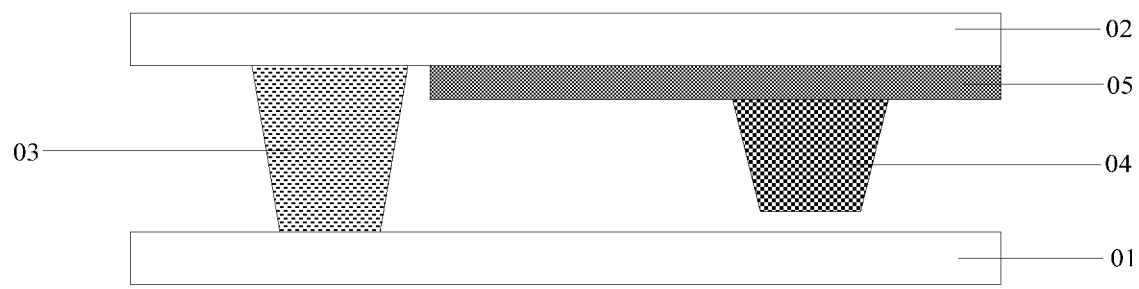
FIG. 3A is a structural schematic view of a liquid crystal display panel provided by at least one embodiment of this disclosure.
Figure 4A:
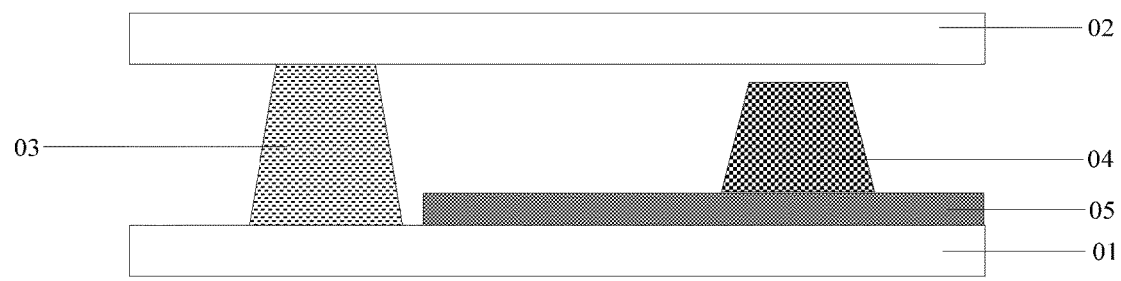
FIG. 4A is a structural schematic view of a liquid crystal display panel provided by at least one embodiment of this disclosure.

Optionally, in the above liquid crystal display panel provided by at least one embodiment of this disclosure, as shown in FIG. 3A, each auxiliary spacer 04 is arranged on a side of the pressure sensing electrode 05 facing the first substrate 01. Similarly, in the above liquid crystal display panel provided by at least one embodiment of this disclosure, as shown in FIG. 4A, each auxiliary spacer 04 is arranged on a side of the pressure sensing electrode 05 facing the second substrate 02.

Figure 3B:
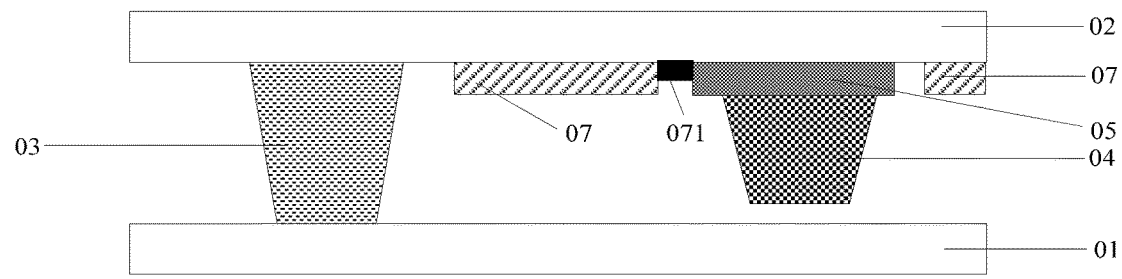
FIG. 3B is a structural schematic view of a liquid crystal display panel provided by at least one embodiment of this disclosure.
Figure 4B:
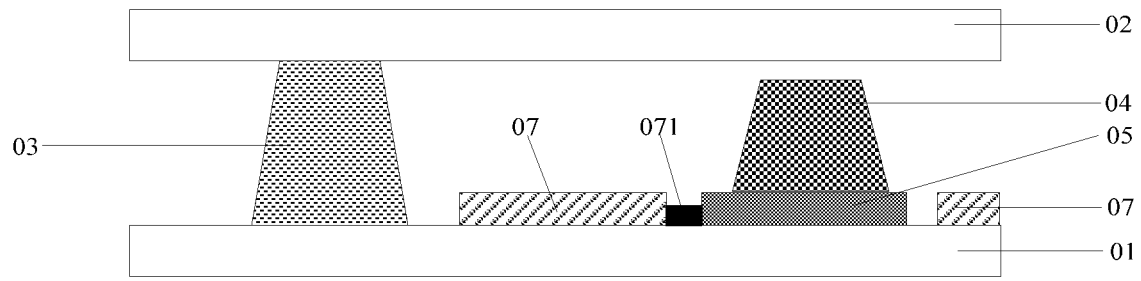
FIG. 4B is a structural schematic view of a liquid crystal display panel provided by at least one embodiment of this disclosure.

Optionally, in the above liquid crystal display panel provided by at least one embodiment of this disclosure, as shown in FIG. 3B, it further comprises a common electrode 07. The common electrode 07 is arranged on a side of the second substrate 02 facing the first substrate 01. The common electrode 07 and the plurality of pressure sensing electrodes 05 are formed only using one mask plate, and the common electrode 07 is electrically coupled to the plurality of pressure sensing electrodes 05 through a switchable switch 071. Similarly, in the above liquid crystal display panel provided by at least one embodiment of this disclosure, as shown in FIG. 4B, it further comprises a common electrode 07. The common electrode 07 is arranged on a side of the first substrate 01 facing the second substrate 02. The common electrode 07 and the plurality of pressure sensing electrodes 05 are formed only using one mask plate, and the common electrode 07 is electrically coupled to the plurality of pressure sensing electrodes 05 through a switchable switch 071. The working principle of the at least one embodiment as shown in FIG. 4B is similar as that of the at least one embodiment as shown in FIG. 3B.

Figure 3C:
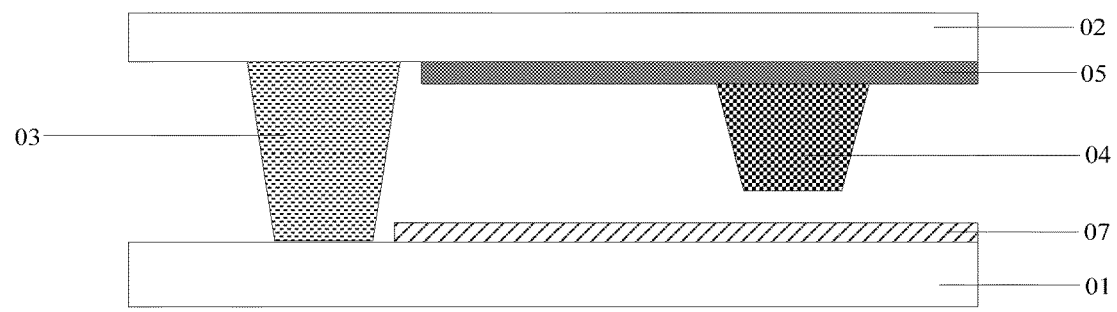
FIG. 3C is a structural schematic view of a liquid crystal display panel provided by at least one embodiment of this disclosure.
Figure 3D:
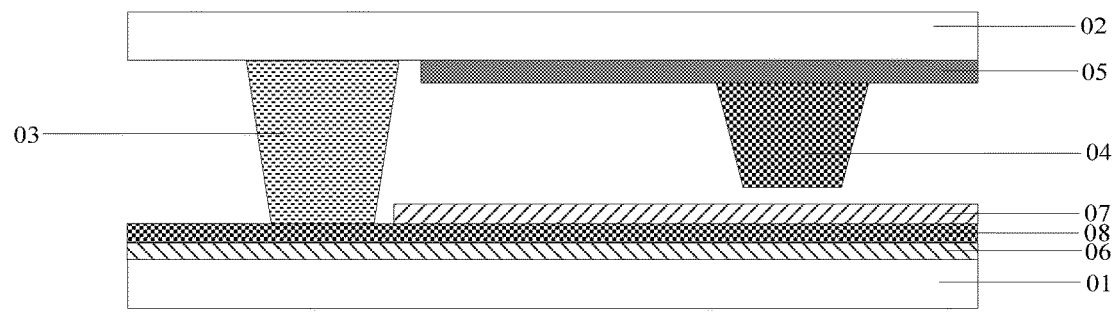
FIG. 3D is a structural schematic view of a liquid crystal display panel provided by at least one embodiment of this disclosure.
Figure 4C:
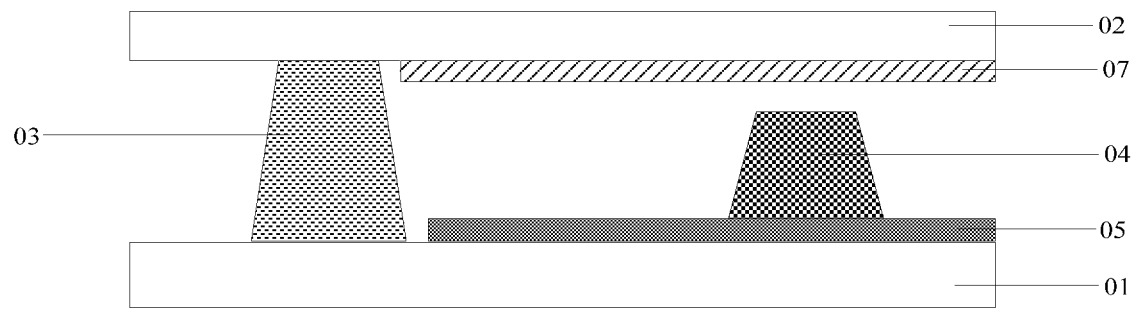
FIG. 4C is a structural schematic view of a liquid crystal display panel provided by at least one embodiment of this disclosure.

Optionally, in the above liquid crystal display panel provided by at least one embodiment of this disclosure, as shown in FIG. 3C, it further comprises a common electrode 07. The common electrode 07 is arranged on a side of the first substrate 01 facing the second substrate 02. Those skilled in the art will understand that on the basis of the at least one embodiment as shown in FIG. 3C, as shown in FIG. 3D, a pixel electrode 06 may be further arranged between the first substrate 01 and the common electrode 07, and an insulating layer 08 is arranged between the pixel electrode 06 and the common electrode 07. Similarly, in the above liquid crystal display panel provided by at least one embodiment of this disclosure, as shown in FIG. 4C, it further comprises a common electrode 07. The common electrode 07 is arranged on a side of the second substrate 02 facing the first substrate 01.

Figure 3E:
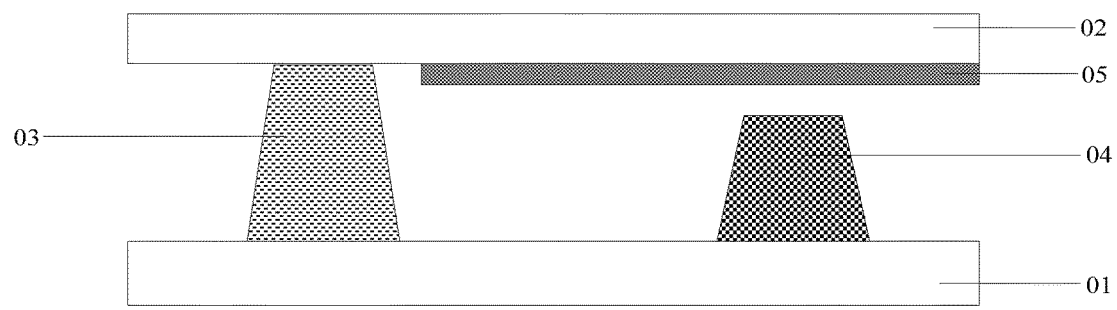
FIG. 3E is a structural schematic view of a liquid crystal display panel provided by at least one embodiment of this disclosure.
Figure 4D:
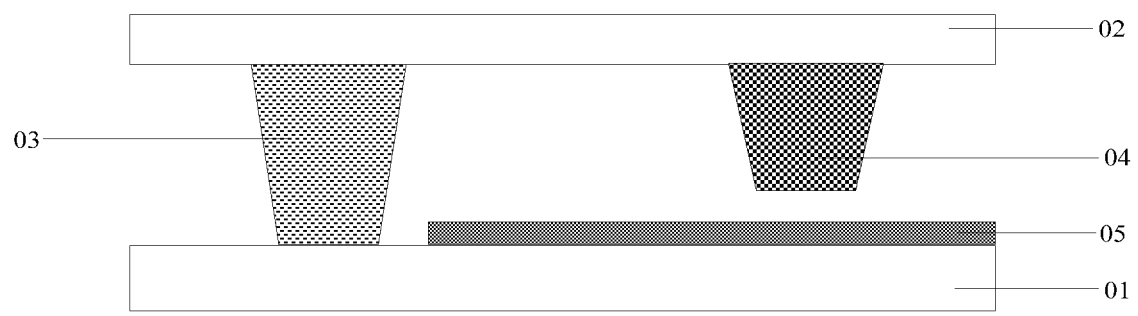
FIG. 4D is a structural schematic view of a liquid crystal display panel provided by at least one embodiment of this disclosure.

Optionally, in the above liquid crystal display panel provided by at least one embodiment of this disclosure, as shown in FIG. 3E, the plurality of auxiliary spacers 04 are arranged on a side of the first substrate 01 facing the second substrate 02. Similarly, in the above liquid crystal display panel provided by at least one embodiment of this disclosure, as shown in FIG. 4D, the plurality of auxiliary spacers 04 are arranged on a side of the second substrate 02 facing the first substrate 01.

Figure 3F:
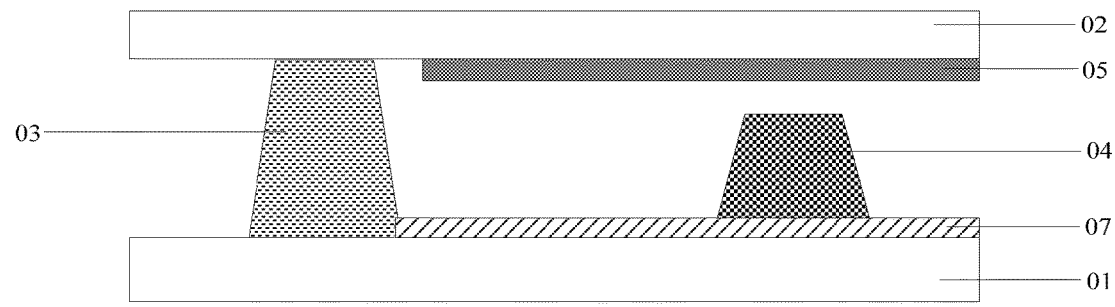
FIG. 3F is a structural schematic view of a liquid crystal display panel provided by at least one embodiment of this disclosure.
Figure 4E:
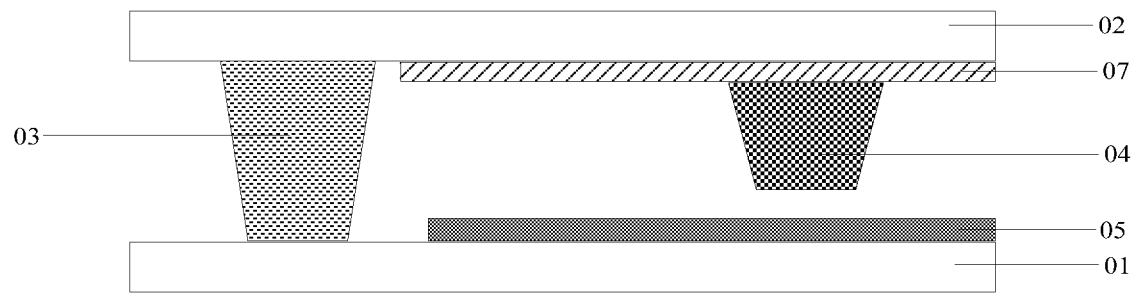
FIG. 4E is a structural schematic view of a liquid crystal display panel provided by at least one embodiment of this disclosure.
Figure 4F:
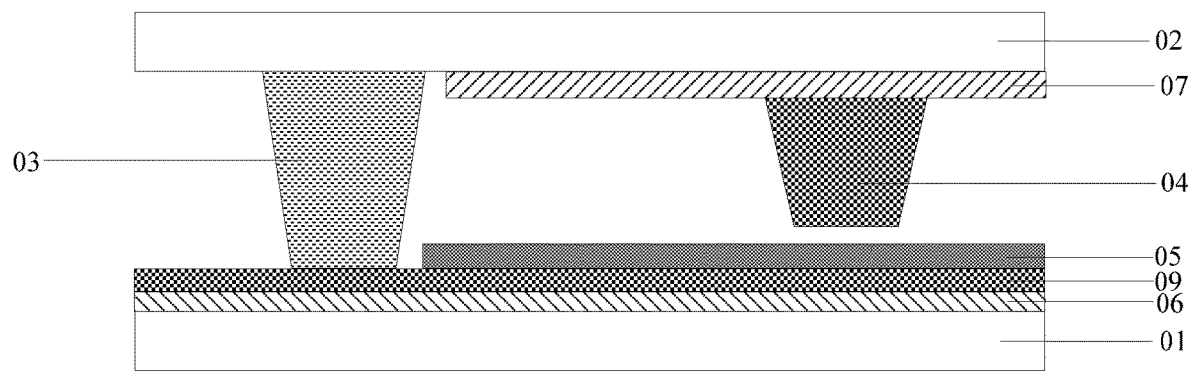
FIG. 4F is a structural schematic view of a liquid crystal display panel provided by at least one embodiment of this disclosure.

Optionally, in the above liquid crystal display panel provided by at least one embodiment of this disclosure, as shown in FIG. 3F, it further comprises a common electrode 07. The common electrode 07 is arranged on a side of the first substrate 01 facing the second substrate 02. The plurality of auxiliary spacers 04 are arranged on a side of the common electrode 07 facing the second substrate 02. Similarly, in the above liquid crystal display panel provided by at least one embodiment of this disclosure, as shown in FIG. 4E, it further comprises a common electrode 07. The common electrode 07 is arranged on a side of the second substrate 02 facing the first substrate 01. The plurality of auxiliary spacers 04 are arranged on a side of the common electrode 07 facing the first substrate 01. Those skilled in the art could understand that on the basis of the at least one embodiment as shown in FIG. 4E, as shown in FIG. 4F, a pixel electrode 06 may be further arranged between the first substrate 01 and the pressure sensing electrode 05, and an insulating layer 09 is arranged between the pressure sensing electrode 05 and the pixel electrode 06. By using the above arrangement form, when the liquid crystal display panel is subjected to pressure, the auxiliary spacer at the force position will provide a corresponding voltage to the pressure sensing electrode 05, so as to generate a touch signal.

Figure 3G:
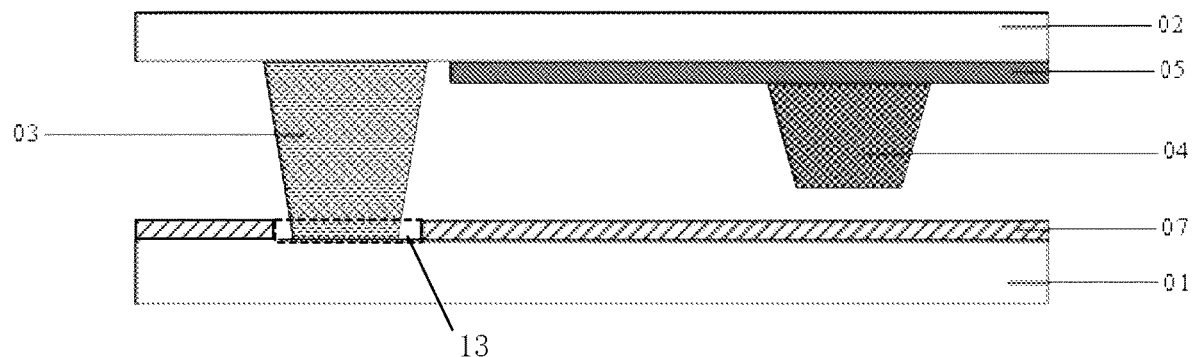
FIG. 3G is a structural schematic view of a liquid crystal display panel provided by at least one embodiment of this disclosure.

Optionally, in the above liquid crystal display panel provided by at least one embodiment of this disclosure, as shown in FIG. 3G, it further comprises a via hole 13. The via hole 13 may be arranged in an area of the common electrode 07 corresponding to the main spacer 03, so as to enable the main spacer 03 to be aligned with the via hole 13 after the opposite substrate and the array substrate are aligned.

Optionally, in the above liquid crystal display panel provided by at least one embodiment of this disclosure, the first substrate 01 is an array substrate, and the second substrate 02 is an opposite substrate (or, a color film substrate).

Optionally, in the above liquid crystal display panel provided by at least one embodiment of this disclosure, the first substrate 01 is an opposite substrate (or, a color film substrate), and the second substrate 02 is an array substrate.

In specific implementation, in the above liquid crystal display panel provided by at least one embodiment of this disclosure, one pressure sensing electrode corresponds to one auxiliary spacer. The material of the pressure sensing electrode may be a transparent conductive material, and may also be a metal material, which will not be defined herein.

In specific implementation, in the above liquid crystal display panel provided by at least one embodiment of this disclosure, when the pressure sensing electrode is made of a transparent conductive material, the transparent conductive material is manufactured as a block structure, i.e., the pressure sensing electrode is a block electrode. When the pressure sensing electrode is made of a metal material, in order to increase the transmissivity, the pressure sensing electrode is generally manufactured as a grid structure, i.e., the pressure sensing electrode is a metal grid electrode.

In specific implementation, in the above liquid crystal display panel provided by at least one embodiment of this disclosure, the material of the main spacer may be same as that of the auxiliary spacer, and may also be different from that of the auxiliary spacer, which will not be defined herein.

Optionally, in specific implementation, in the above liquid crystal display panel provided by at least one embodiment of this disclosure, the material of the main spacer is same as that of the auxiliary spacer, in this way, the main spacer and the auxiliary spacer may be prepared in the same layer, i.e., only using one mask plate to form patterns of the main spacer and the auxiliary spacer, which may simplify the preparation process, save the production cost and increase the production efficiency.

In specific implementation, in the above liquid crystal display panel provided by at least one embodiment of this disclosure, the common electrode and the main spacer are in insulation arrangement. Optionally, the pressure sensing electrode and the main spacer are also in insulation arrangement, because the main spacer only plays the function of supporting in the liquid crystal display panel. Since the material of the main spacer is same as that of the auxiliary spacer, which are both piezoelectric material, when the liquid crystal display panel is subjected to pressure, the main spacer generates charges, which may affect the signals on the common electrode and the pressure sensing electrode, thereby affecting determination of display and touch function of the liquid crystal display panel.

In specific implementation, in the above liquid crystal display panel provided by at least one embodiment of this disclosure, the insulation arrangement of the common electrode and the main spacer may be realized by arranging an insulating layer between the common electrode and the main spacer, in this way, it may ensure that when the liquid crystal display panel is subjected to pressure, the main spacer only plays the supporting function, and the main spacer generating charges would not affect the signal on the common electrode, thereby not affecting display. However, the arrangement of the insulating layer will increase the manufacturing cost and the thickness of the liquid crystal display panel.

In specific implementation, in the above liquid crystal display panel provided by at least one embodiment of this disclosure, an orthographic projection of the common electrode on the array substrate does not overlap with an orthographic projection of the main spacer on the array substrate. Thus, it may ensure that when the liquid crystal display panel is subjected to pressure, the main spacer only plays the supporting function, and the main spacer generating charges would not affect the signal on the common electrode.

In specific implementation, in the above liquid crystal display panel provided by at least one embodiment of this disclosure, a via hole may be arranged in an area of the common electrode corresponding to the main spacer, so as to enable the main spacer to be aligned with the via hole after the opposite substrate and the array substrate are aligned. Thus, it ensures that the main spacer is not in contact with the common electrode, i.e., the orthographic projection of the common electrode on the array substrate does not overlap with the orthographic projection of the main spacer on the array substrate, so as to realize insulation arrangement of the common electrode and the main spacer, which will not be defined herein.

Next, this disclosure will explain the pressure sensitive touch function of the above liquid crystal display panel provided by at least one embodiment of this disclosure in detail through three specific embodiments.

Embodiment I

The explanation is made by taking the example that the common electrode is located on a side of the array substrate facing the auxiliary spacer.

In specific implementation, in the above liquid crystal display panel provided by at least one embodiment of this disclosure, as shown in FIG. 3D, the common electrode 07 is located on a side of the first substrate 01 facing the auxiliary spacer 04.

The pressure sensing electrode 05 is in direct contact with the auxiliary spacer 04, and the pressure sensing electrode 05 and the common electrode 07 are in isolation arrangement.

Herein, the "isolation arrangement" means when the liquid crystal display panel is not subjected to pressure, there is a certain distance between the pressure sensing electrode 05 and the common electrode 07. In this way, and when it is not subjected to pressure, there will be no signal on the pressure sensing electrode 05, when it is subjected to pressure, the auxiliary spacer 04 will be in contact with the common electrode 07 so as to be conducted, so as to generate a piezoelectric signal. The signal on the pressure sensing electrode 05 is the signal on the common electrode 07 superposing the piezoelectric signal. In this way, the arrangement of the common electrode 07 may enhance the touch signal obtained by the pressure sensing electrode 05, so as to increase the touch sensitivity of the liquid crystal display panel. For example, set the piezoelectric signal to be 0.1V, and set the signal on the common electrode 07 to be 5V, thus the signal obtained by the pressure sensing electrode 05 will be a superposition signal of the signal on the common electrode 07 and the piezoelectric signal, i.e., 5.1V. When the touch pressure changes, the generated piezoelectric signal will also change, set the generated piezoelectric signal to be 0.15V, thus the signal obtained by the pressure sensing electrode 05 will be 5.15V, i.e., with the change of the pressure, the signal obtained by the pressure sensing electrode 05 will be the signal on the common electrode 07 superposing the piezoelectric signal, and the change of the superposed piezoelectric signal relative to the signal on the common electrode 07 is not obvious, which would not result in effect to the neighboring pixel display.

Optionally, in specific implementation, in the above liquid crystal display panel provided by at least one embodiment of this disclosure, as shown in FIG. 3D, the pressure sensing electrode 05 is located on a side of the auxiliary spacer 04 facing the opposite substrate 02. In specific implementation, the auxiliary spacer 04 is generally manufactured on the opposite substrate 02, hence, the pressure sensing electrode 05 is manufactured on the opposite substrate 02 firstly, and then the auxiliary spacer 04 is manufactured. In this way, the manufacturing process is relatively simple. If the auxiliary spacer 04 is manufactured on the opposite substrate 02 firstly, and then the pressure sensing electrode 05 is manufactured, the manufacturing process difficulty will be increased, since the height of the auxiliary spacer 04 is relatively high.

Embodiment II

The explanation is made by taking the example that the common electrode is located on a side of the opposite substrate facing the auxiliary spacer.

In specific implementation, in the above liquid crystal display panel provided by at least one embodiment of this disclosure, as shown in FIG. 4F, the common electrode 07 is located on a side of the second substrate 02 facing the auxiliary spacer 04. The pressure sensing electrode 05 is located between the auxiliary spacer 04 and the pixel electrode 06, and the pressure sensing electrode and the pixel electrode 06 are insulated from each other. The pressure sensing electrode 05 and the pixel electrode 06 are insulated by the insulating layer 09 located between the pressure sensing electrode 05 and the pixel electrode 06.

In specific implementation, in the above liquid crystal display panel provided by at least one embodiment of this disclosure, as shown in FIG. 4F, the auxiliary spacer 04 is fixed on the opposite substrate 02. The pressure sensing electrode 05 and the auxiliary spacer 04 are in isolation arrangement.

Herein, the "isolation arrangement" means when the liquid crystal display panel is not subjected to pressure, there is a certain distance between the pressure sensing electrode 05 and the auxiliary spacer 04. In this way, when it is not subjected to pressure, there will be no signal on the pressure sensing electrode 05, and when it is subjected to pressure, the pressure sensing electrode 05 will be in contact with the auxiliary spacer 04, so as to be conducted, so as to generate a piezoelectric signal. The signal on the pressure sensing electrode 05 is the signal on the common electrode 07 superposing the piezoelectric signal. In this way, the arrangement of the common electrode 07 may enhance the touch signal obtained by the pressure sensing electrode 05, so as to increase the touch sensitivity of the liquid crystal display panel. For example, set the piezoelectric signal to be 0.1V and the signal on the common electrode 07 to be 5V, thus the signal obtained by the pressure sensing electrode 05 will be 5.1V. When the pressure changes, set the generated piezoelectric signal to be 0.15V, thus the signal obtained by the pressure sensing electrode 05 will be 5.15V, i.e., with the change of the pressure, the signal obtained by the pressure sensing electrode 05 will be the signal on the common electrode 07 superposing the piezoelectric signal, and the change of the superposed piezoelectric signal relative to the signal on the common electrode 07 is not obvious, which would not result in effect to the neighboring pixel display.

Embodiment III

In specific implementation, in the above liquid crystal display panel provided by at least one embodiment of this disclosure, as shown in FIG. 3B, the common electrode 07 is arranged on a side of the second substrate 02 facing the first substrate 01. The common electrode 07 and the plurality of pressure sensing electrodes 05 are formed only using one mask plate, and the common electrode 07 may be electrically coupled to the plurality of pressure sensing electrodes 05 through a switchable switch 071. In this way, not only the manufacturing process of a layer of pressure sensing electrodes may be saved, but also the thickness of the liquid crystal display panel may be reduced. Such an arrangement may enhance the touch signal obtained by the pressure sensing electrode 05, so as to improve touch sensitivity of the liquid crystal display panel. In the display phase, the switchable switch 071 electrically connects the common electrode 07 and the plurality of pressure sensing electrodes 05. The common electrode 07 and the plurality of pressure sensing electrodes 05 have the same potential. Hence, in the display phase, the plurality of pressure sensing electrodes 05 may also serve as the common electrode. In the touch phase, the switchable switch 071 is disconnected, when a certain position of the liquid crystal display panel is subjected to pressure, the auxiliary spacer 04 will generate a piezoelectric signal due to the effect of the pressure. The signal on the pressure sensing electrode 05 is the piezoelectric signal. Thus, if the piezoelectric signal is set to be 0.1V, the signal obtained by the pressure sensing electrode 05 is 0.1V. When the pressure changes, such as if the generated piezoelectric signal is set to be 0.15V, the signal obtained by the pressure sensing electrode 05 is 0.15V. That is to say, with the change of the pressure, the signal obtained by the pressure sensing electrode 05 is the piezoelectric signal, and the piezoelectric signal will not affect the signal (i.e., the voltage on the common electrode 07) on the common electrode 07 remarkably, therefore the neighboring pixel display will not be affected.

To sum up, the above three embodiments provided by this disclosure implement the pressure sensitive touch function of the liquid crystal display panel by using auxiliary spacer multiplexed as the touch layer, and when not subjected to pressure, the pressure sensing electrode is in a floating state, hence, the function of reducing the power consumption of the liquid crystal display panel may be achieved.

In specific implementation, in the above liquid crystal display panel provided by at least one embodiment of this disclosure, the piezoelectric material is an organic piezoelectric material, such as polyvinylidene fluoride (PVDF), which will not be defined herein.

Figure 5:
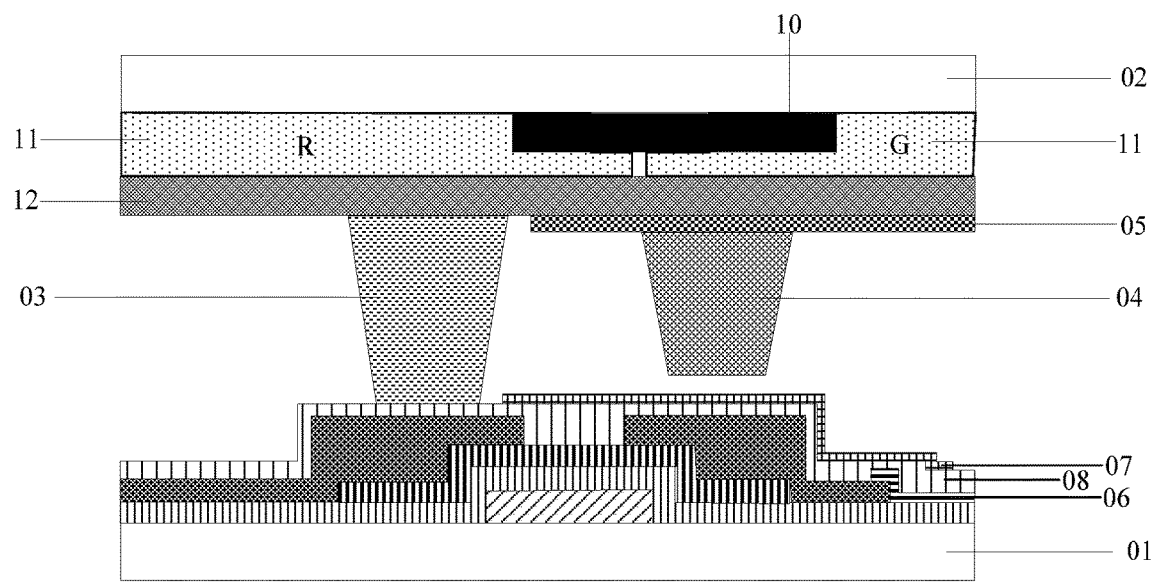
FIG. 5 is a structural schematic view of a liquid crystal display panel provided by at least one embodiment of this disclosure.

In specific implementation, in the above liquid crystal display panel provided by at least one embodiment of this disclosure, as shown in FIG. 5, it further comprises: a black matrix layer 10 located on the opposite substrate 02 and a photoresist layer 11 of various colors, as well as a planarization layer 12 that covers the black matrix layer 10 and the photoresist layer 11. The orthographic projection of the black matrix layer 10 on the first substrate 01 covers the orthographic projection of each auxiliary spacer 04 on the array substrate 01. The black matrix layer 10 generally covers an area between two adjacent photoresist layers 11, i.e., the black matrix layer 10 does not occupy the display area. This arrangement allows the auxiliary spacer 04 does not occupy the opening area of the pixel unit, thereby not affecting the aperture opening ratio of the pixel unit.

In specific implementation, in the above liquid crystal display panel provided by at least one embodiment of this disclosure, as shown in FIG. 5, it further comprises: a thin film transistor (TFT) structure located on the first substrate 01. Because this TFT structure is same as the existing structure, the specific manufacturing process will not be elaborated herein.

Based on the same inventive concept, at least one embodiment of this disclosure further provides a manufacturing method of a liquid crystal display panel, comprising: forming patterns of a plurality of mutually independent pressure sensing electrodes on a first substrate; forming patterns of auxiliary spacers on the pressure sensing electrodes, and forming patterns of main spacers between the pressure sensing electrodes; applying a second substrate to form a cell gap between the first substrate and the second substrate; wherein a height of the auxiliary spacer is smaller than a height of the main spacer, a material of the auxiliary spacer is a piezoelectric material.

Optionally, in the above manufacturing method of a liquid crystal display panel provided by at least one embodiment of this disclosure, it further comprises: forming a pattern of a common electrode on the second substrate; wherein a via hole is arranged in an area of the common electrode corresponding to the main spacer, so as to enable the main spacer to be aligned with the via hole after the opposite substrate and the array substrate form a cell gap.

In specific implementation, all the film layers on the first substrate may be formed firstly, and then all the film layers on the second substrate are formed. Of course, all the film layers on the second substrate may also be formed firstly, and then all the film layers on the first substrate are formed, which will not be defined herein.

In specific implementation, in the above liquid crystal display panel provided by at least one embodiment of this disclosure, the first substrate is an array substrate, and the second substrate is an opposite substrate. After all the film layers on the opposite substrate and all the film layers on the array substrate are formed, the opposite substrate and the array substrate are aligned to form the liquid crystal display panel.

Optionally, in the above manufacturing method of a liquid crystal display panel provided by at least one embodiment of this disclosure, the patterns of the main spacer and the auxiliary spacer are formed only using one mask plate. Thus, it may simplify the preparation process, save the production cost and increase the production efficiency.

Figure 6:
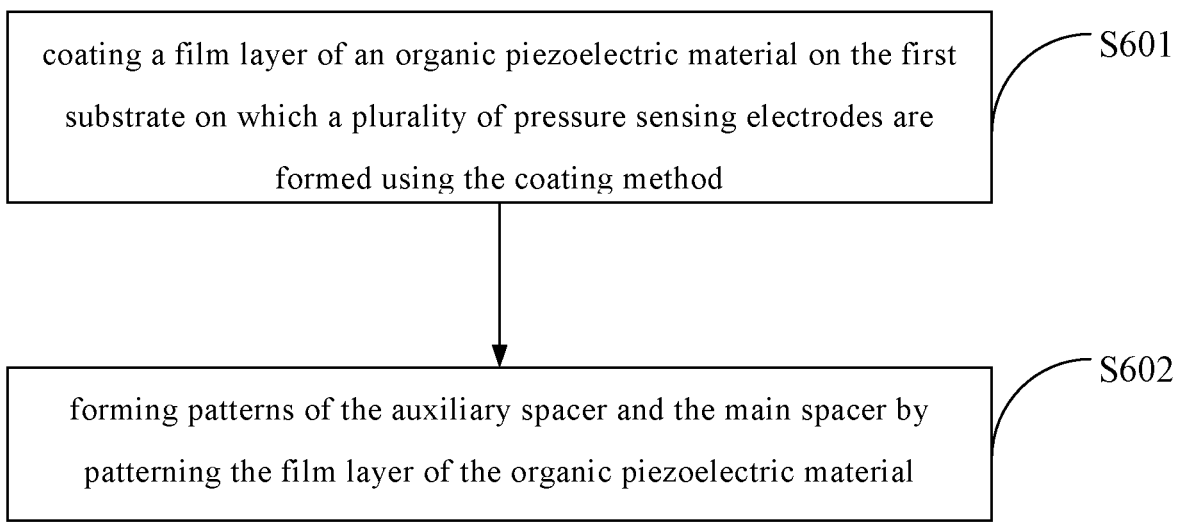
FIG. 6 is a flow chart of forming of patterns of main spacers and auxiliary spacers in a liquid crystal display panel provided by at least one embodiment of this disclosure.

Optionally, in the above manufacturing method of a liquid crystal display panel provided by at least one embodiment of this disclosure, as shown in FIG. 6, the step that the patterns of the main spacer and the auxiliary spacer are formed only using one mask plate comprises: S601, coating a film layer of an organic piezoelectric material on the first substrate on which a plurality of pressure sensing electrodes are formed using the coating method; and S602, forming patterns of the auxiliary spacer and the main spacer by patterning the film layer of the organic piezoelectric material.

In specific implementation, the film layer of the organic piezoelectric material may be patterned using a gray-tone or half-tone mask plate, so as to remove the area in the film layer of the organic piezoelectric material corresponding to the light shielding area of the mask plate, form the main spacer in an area corresponding to the full transparent area of the mask plate, and form the auxiliary spacer in an area corresponding to the partial transparent area of the mask plate.

Based on the same inventive concept, at least one embodiment of this disclosure further provides a display device, comprising any liquid crystal display panel provided by at least one embodiment of this disclosure. The principle for solving problems of the display device is similar as the preceding liquid crystal display panel; hence, the implementation of the display device may make reference to the implementation of the preceding liquid crystal display panel, which will not be repeated herein.

In specific implementation, the display device provided by at least one embodiment of this disclosure may be any product or component having a display function, such as a mobile phone, a tablet, a television, a display, a laptop, a digital photo frame or a navigator. All other essential composite parts of the display device should be understood by the ordinary skilled in the art, which will not be repeated herein, nor should be taken as limitation to this disclosure. The implementation of the display device may make reference to the embodiments of the above liquid crystal display panel, which will not be repeated.

In the liquid crystal display panel, the manufacturing method thereof and the display device provided by embodiments of this disclosure, the auxiliary spacers within the liquid crystal display panel are made of a piezoelectric material, when the liquid crystal display panel is subjected to pressure, the auxiliary spacers will be compressed to generate a piezoelectric signal, the pressure sensing electrodes at the corresponding positions are in contact with the auxiliary spacers, the pressure sensing electrodes will obtain the piezoelectric signal, so as to implement the pressure sensitive touch function of the liquid crystal display panel. Since the auxiliary spacers within the liquid crystal display panel are made of the piezoelectric material, the auxiliary spacers may be multiplexed as a touch layer of pressure sensing, and the touch layer does not need to be manufactured separately, thereby being capable of reducing the thickness of the liquid crystal display panel and the manufacturing process thereof. Moreover, the auxiliary spacers in this disclosure generate charges only when subjected to pressure, they are in a floating state when not subjected to pressure, hence, the power consumption of the liquid crystal display panel may be reduced.

Apparently, those skilled in the art may make various amendments and modifications to this disclosure without departing from the spirit and the scope of this disclosure. In this way, provided that these amendments and modifications of this disclosure belong to the scopes of the claims of this disclosure and the equivalent technologies thereof, this disclosure also intends to encompass these amendments sand modifications.

The invention claimed is:

1. A liquid crystal display panel, comprising: a first substrate and a second substrate arranged oppositely, a plurality of main spacers located between the first substrate and the second substrate for supporting a cell gap of the liquid crystal display panel, a plurality of auxiliary spacers located between the first substrate and the second substrate, a plurality of mutually independent pressure sensing electrodes in one-to-one correspondence with the plurality of auxiliary spacers, and a common electrode;

wherein a height of the auxiliary spacer is smaller than a height of the main spacer; a material of the auxiliary spacer is a piezoelectric material, wherein the plurality of pressure sensing electrodes are arranged on a side of the second substrate facing the first substrate, and each auxiliary spacer is arranged on a side of the pressure sensing electrode facing the first substrate, the pressure sensing electrode is between the auxiliary spacer and the second substrate, and wherein the common electrode is arranged on a side of the second substrate facing the first substrate, the common electrode and the plurality of pressure sensing electrodes is formed only using one mask plate, and the common electrode is electrically coupled to the plurality of pressure sensing electrodes through a switchable switch, and wherein the common electrode and the main spacer are in insulation arrangement.

2. The liquid crystal display panel as claimed in claim 1, wherein the first substrate is an array substrate; the second substrate is an opposite substrate.

3. The liquid crystal display panel as claimed in claim 1, wherein the first substrate is an opposite substrate; the second substrate is an array substrate.

4. The liquid crystal display panel as claimed in claim 1, wherein the piezoelectric material is an organic piezoelectric material.

5. The liquid crystal display panel as claimed in claim 1, wherein a material of the main spacer is same as that of the auxiliary spacer.

6. The liquid crystal display panel as claimed in claim 1, wherein an orthographic projection of the common electrode on the first substrate does not overlap with an orthographic projection of the main spacer on the first substrate.

7. A display device, characterized by comprising the liquid crystal display panel as claimed in claim 1.

\* \* \* \* \*